Figure 1:
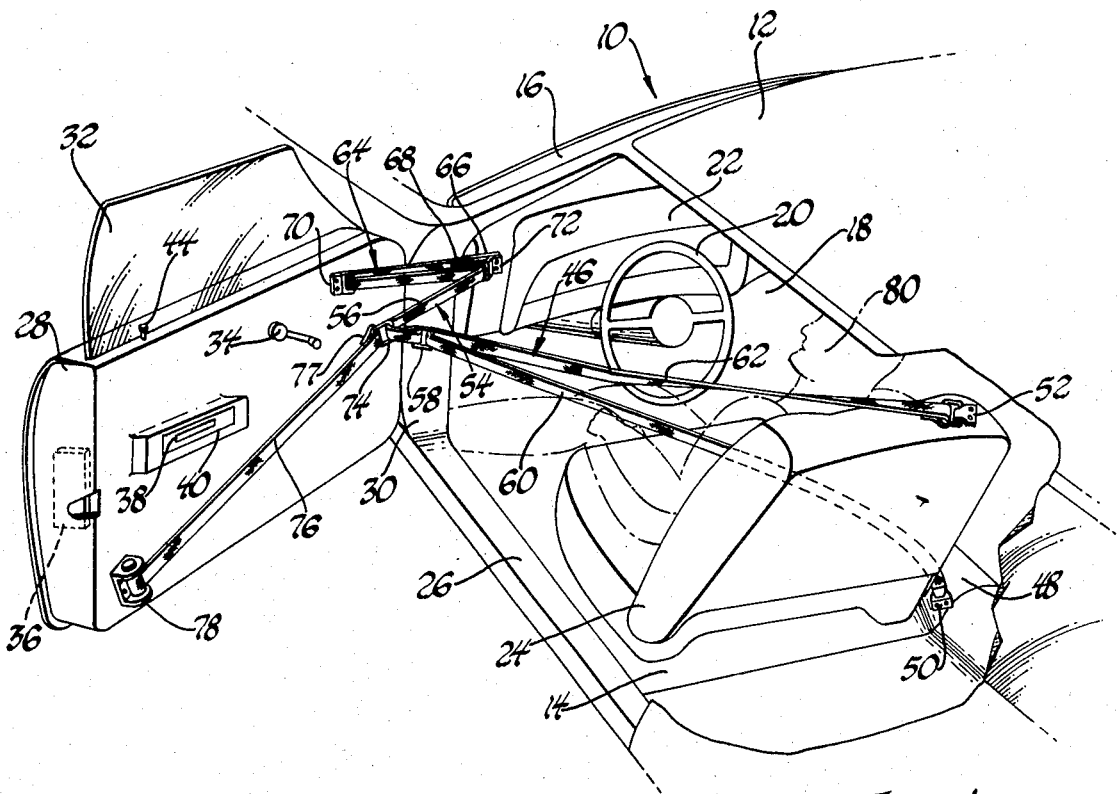

United States Patent
Fancy

[15] 3,694,002
[45] Sept. 26, 1972

[54] CONTROL BELT SYSTEM FOR A VEHICLE BODY OCCUPANT RESTRAINING BELT ARRANGEMENT

[72] Inventor: Richard E. Fancy, Rochester, Mich.
[73] Assignee: General Motors Corporation, Detroit, Mich.
[22] Filed: May 18, 1971
[21] Appl. No.: 144,524

[52] U.S. Cl. ............................................280/150 SB
[51] Int. Cl. .............................................B60r 21/10
[58] Field of Search ..................280/150 SB; 297/388

[56] References Cited
UNITED STATES PATENTS

| | | | |
|---|---|---|---|
| 3,583,726 | 6/1971 | Lindbold | 280/150 SB |
| 3,506,083 | 4/1970 | Bontick | 280/150 SB |
| 3,411,602 | 11/1968 | Royce | 280/150 SB |
| 2,937,882 | 5/1960 | Oppenheim | 280/150 SB |

Primary Examiner—Benjamin Hersh
Assistant Examiner—Robert R. Song
Attorney—Herbert Furman and W. E. Finken

[57] ABSTRACT

A control belt system for a vehicle body occupant restraining belt arrangement including lap and shoulder belt portions disposed across a vehicle body seat with the outboard ends secured to each other and slidably receiving a first apertured member adjacent a forwardly pivoting vehicle body door. The control belt system includes a first control belt with one end attached to the first apertured member, a plurality of body and door mounted slide members between which intermediate portions of the first control belt extend and slide over in a tackle arrangement to move the first apertured member and the lap and shoulder belt portions forwardly to easy-enter positions during door opening movement, a second control belt with one end secured to a second apertured member slidably received on the first control belt adjacent the first apertured member, and a door mounted retractor with a normally retracting rotatable reel selectively locked against belt extending movement and receiving the other end of the second control belt which is retracted during door closing movement to move the lap and shoulder belt portions rearwardly to occupant restraining positions with respect to a seated occupant.

3 Claims, 2 Drawing Figures

PATENTED SEP 26 1972

3,694,002

INVENTOR.
Richard E. Fancy
BY
Herbert Furman
ATTORNEY

CONTROL BELT SYSTEM FOR A VEHICLE BODY OCCUPANT RESTRAINING BELT ARRANGEMENT

This invention relates to a control belt system for a vehicle body occupant restraining belt arrangement including lap and shoulder belt portions and, more particularly, to such a system for moving the lap and shoulder belt portions between easy-enter and occupant restraining positions in response to door movement.

It is know to provide a carrier slidably mounted on a vehicle body door and movable between forward and rearward positions to move an attached belt between easy-enter and occupant restraining positions in response to door movement. The U.S. Pat. applications of Weststrate, Ser. No. 118,607, filed Feb. 25, 1971, now abandoned, and Ser. No. 174,664, a continuation in part of Ser. No. 118,607 filed Aug. 25, 1971, both assigned to the assignee of the present invention, disclose a belt arrangement in which a body mounted control retractor and a door mounted inertia retractor respectively receive a cable and a control belt, both of which are connected to lap and shoulder belt portions to move the belt portions between occupant restraining and easy-enter positions in response to door movement. The U.S. Pat. application of Weststrate, Ser. No. 118,604, filed on Feb. 25, 1971 and also assigned to the assignee of the present invention, discloses a belt arrangement in which a door mounted control retractor and a door mounted inertia retractor receive respective control belts operatively connected to lap and shoulder belt portions to move the belt portions between easy-enter and occupant restraining positions in response to door movement.

This invention provides a control belt system with a first control belt extending between a vehicle body and an associated door in a tackle arrangement and connected to lap and shoulder belt portions to move the belt portions to easy-enter positions during door opening movement, and a second control belt received and normally retracted by a rotatable reel of a door mounted retractor and connected to the lap and shoulder belt portions to move the belt portions to occupant restraining positions during door movement to closed position.

In the preferred embodiment of the invention, the first control belt has a first end secured to an apertured member slidable along an occupant restraining belt to define the lap and shoulder belt portions. The other end of the first control belt is slidable through body and door mounted slide members in a tackle arrangement to retract the first end of the first control belt during door opening movement and move the lap and shoulder belt portions forwardly to easy-enter positions. A second control belt has one end secured to a second apertured member slidable along the first control belt between the first apertured member and the tackle arrangement. The other end of the second control belt is received by a rotatable reel of the door mounted retractor that is selectively locked against belt extending movement and which normally retracts the second control belt to move the lap and shoulder belt portions to occupant restraining positions during door closing movement.

Accordingly, one feature of this invention is that it provides a control belt system with a first control belt extending between a vehicle body and an associated door in a tackle arrangement and connected to lap and shoulder belt portions to move the belt portions to easy-enter positions during door opening movement, and with a second control belt operatively connected to the lap and shoulder belt portions and received and normally retracted by a reel of a door mounted retractor to move the belt portions to occupant restraining positions with respect to a seated occupant during door closing movement.

Another feature of this invention is that it provides such a control belt system with the first control belt attached to a first apertured member slidable along the lap and shoulder belt portions, and with the second control belt attached to a second apertured member slidable along the first control belt between the tackle arrangement and the lap and shoulder belt portions.

Figure 2:
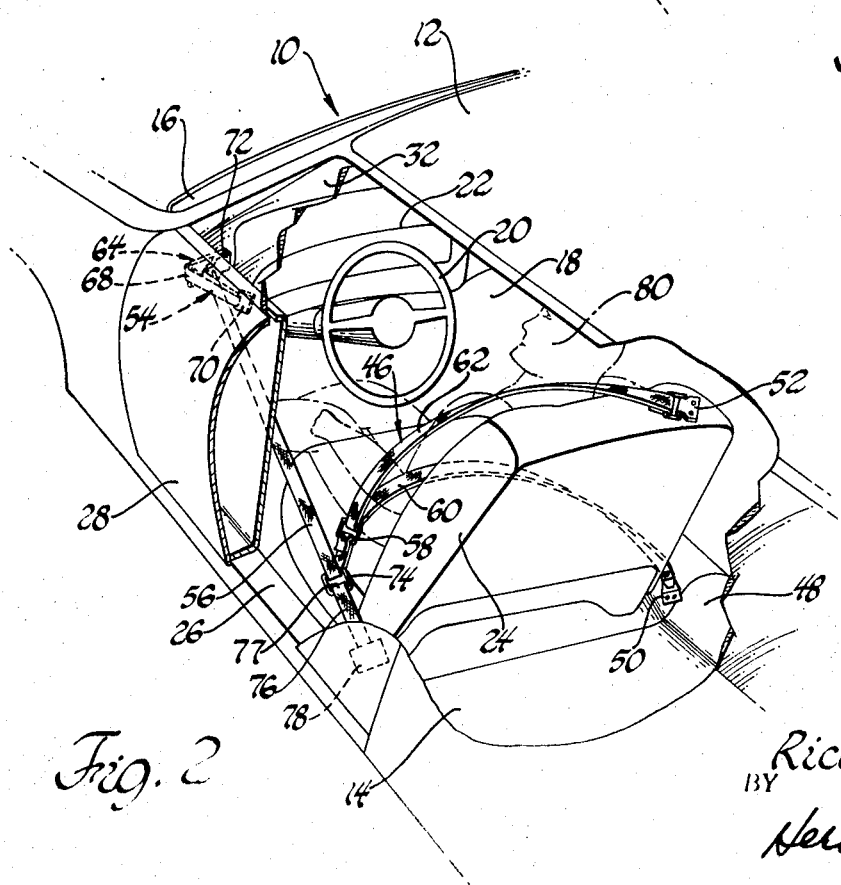

These and other features of this invention will be readily apparent from the following detailed description and drawings in which:

FIG. 1 is a partially broken away perspective view of a portion of a vehicle body whose door is shown in open position where a control belt system, according to this invention, maintains lap and shoulder belt portions in easy-enter positions; and FIG. 2 is a view similar to FIG. 1 with the door shown in closed position where the control belt system maintains the lap and shoulder belt portions in occupant restraining positions.

Referring now to the drawings, a vehicle body is generally indicated by 10 and includes a roof 12, a floor 14, and a windshield 16 that generally cooperate to define an occupant compartment 18. Within compartment 18, a steering wheel 20 is conventionally mounted adjacent an instrument panel 22 forward of a conventionally mounted bucket type seat 24. Seat 24 is accessible through a vehicle body side door opening 26 selectively opened and closed by a door 28 whose forward edge is pivoted to a front body pillar 30 in a conventional manner. Door 28 supports a conventional side window 32 selectively raised and lowered by a window regulator handle 34. A conventional door lock assembly whose general outline is shown in FIG. 1 by 36, but which is not shown in detail, includes the usual latch mechanism movable to a latch position to engage a vehicle body mounted keeper, not shown, and maintain the door 28 in closed position. An inside remote release handle 38 within a depression 40 of an armrest 42 is actuable to unlatch lock assembly 36 when a garnish button 44 or an outside key cylinder, not shown, positions the lock mechanism of the lock assembly in an unlocked position.

An occupant restraining belt generally indicated at 46 has one end secured to the vehicle floor transmission tunnel 48 by an attachment 50 slightly inboard and adjacent a rear portion of the seat 24. The other end of restraining belt 46 is secured to an inboard upper portion of the seat back of seat 24 by an attachment 52. It is also possible for attachment 52 to secure the other end of restraining belt 46 to a generally central portion of the roof 12, such as adjacent the vehicle dome light.

A control belt system, according to this invention, is generally indicated by 54 and includes a first control belt 56 with one end secured to a first apertured member 58 slidable along belt 46 to define lap and shoulder belt portions 60 and 62. The other end of belt 56 extends between the vehicle body and door in a tackle arrangement generally indicated by 64. Tackle arrangement 64 includes an apertured flange 66 suitably mounted on the outboard end of instrument panel 22 and receiving the looped end 68 of belt 56. From the looped end, belt 56 extends to and through an apertured slide member 70 suitably mounted on an upper forward portion of door 28. From slide member 70, belt 56 extends to and through a flanged apertured slide member 72 suitably mounted on instrument panel 22 adjacent flange 66. Between the slide member 72 and the first apertured member 58, a second apertured member 74 is slidable along belt 56. A second control belt 76 of the control belt system has a looped end 77 received within apertured member 74 and has the other belt end received and normally retracted by a rotatable reel of a retractor 78 suitably mounted on a lower rearward portion of door 28.

Retractor 78 is of the type disclosed in the U.S. Pat. application of Arlauskas et al. Ser. No. 114,470, filed May 18, 1971 and assigned to the assignee of the present invention such that the reel of the retractor is locked against belt extending movement when the latch mechanism of door lock assembly 36 is in latched position, as when door 28 is closed. With the door 28 in closed position, a partial actuation of release handle 38 temporarily releases the reel of retractor 78 to allow belt extending movement until the release handle is deactuated. When the release handle 38 is fully actuated to move the latch mechanism of door lock assembly 36 to unlatched position and allow door opening movement, the reel of retractor 78 remains freewheeling to allow belt extending movement until the latch mechanism is again moved to latched position by closing movement of door 28.

During movement of the door 28 to the FIG. 1 open position, slide member 70 of tackle arrangement 64 moves away from slide member 72 to lengthen the tackle arrangement as belt 56 slides through the slide members and retracts the one end of the belt, moving the first apertured member 58 forwardly to position the lap and shoulder belt portions 60 and 62 in easy-enter positions. As the one end of belt 56 is retracted, the reel of retractor 78 allows extending movement of belt 76 while the normal retracting bias of the reel forms a bight portion in belt 56 adjacent the one belt end secured to apertured member 58.

During movement of the door 28 to the FIG. 2 closed position, the retracting bias of the reel of retractor 78 retracts belt 76 to extend the one end of belt 56 from the shortening tackle arrangement 64. As belt 76 is retracted, lap and shoulder belt portions 60 and 62 are moved to the FIG. 2 occupant restraining positions with respect to the phantom line indicated seated occupant 80 without an deliberate effort on the part of the occupant. When the latch mechanism of door lock assembly 36 moves to the latched position to maintain the door 28 in closed position, the reel of the retractor 78 is locked against belt extending movement and belt 76 thus maintains the lap and shoulder belt portions in the restraining positions.

The rate of lengthening of tackle arrangement 64 during door opening movement can be controlled by the relative positioning of slide members 70 and 72 on the door and vehicle body, thus controlling the rate of retraction of the one end of belt 56 and the consequent rate of forward movement of lap and shoulder belt portions 60 and 62. It is also possible to vary the number of slide members and the number of times belt 56 extends between the vehicle body and the door to thus vary the rate of retraction of the one end of belt 56 with respect to the rate of movement of the slide members relative to each other. Likewise, it is possible to utilize rollers mounted on the slide members to achieve substantially frictionless operation.

The invention thus provides an improved control belt system for a vehicle body occupant restraining belt arrangement.

What is claimed is:

1. In combination with a vehicle body including a seat, a door mounted for forwardly pivoting movement between open and closed positions with respect to a vehicle body opening adjacent the seat, and an occupant restraining belt arrangement with lap and shoulder belt portions disposed across the seat and having the outboard ends thereof operatively secured to each other, a control belt system comprising, a first control belt with one end operatively secured to the outboard ends of the lap and shoulder belt portions, a plurality of body and door mounted slide members generally adjacent an upper forward portion of the door, means securing the other end of the first control belt to one of the slide members with at least two intermediate belt portions extending between the body and the door and slidable over the slide members in a tackle arrangement to retract the one end of the first control belt during door opening movement and move the lap and shoulder belt portions forwardly to easy-enter positions, a second control belt with one end operatively secured to the outboard ends of the lap and shoulder belt portions, and a door mounted retractor including a rotatable reel selectively locked against belt extending movement, the reel receiving and normally retracting the other end of the second control belt to move the lap and shoulder belt portions rearwardly during door closing movement to occupant restraining positions with respect to a seated occupant.

2. In combination with a vehicle body including a seat, a door mounted for forwardly pivoting movement between open and closed positions with respect to a vehicle body opening adjacent the seat, and an occupant restraining belt arrangement with a restraining belt whose ends are secured adjacent generally vertically aligned inboard portions of the seat and whose intermediate portion slidably receives a first apertured member to define lap and shoulder belt portions, a control belt system comprising, a first control belt with one end secured to the first apertured member, a plurality of body and door mounted slide members generally adjacent an upper forward portion of the door, means securing the other end of the first control belt to one of the slide members with at least two intermediate belt portions extending between the body and the door and slidable over the slide members in a tackle arrangement to retract the one end of the first control belt during door opening movement and move the lap and shoulder belt portions forwardly to easy-enter positions, a second control belt with one end operatively secured to the outboard ends of the lap and shoulder belt portions, and a door mounted retractor including a rotatable reel selectively locked against belt extending movement, the reel receiving and normally retracting the other end of the second control belt to move the lap and shoulder belt portions rearwardly during door closing movement to occupant restraining positions with respect to a seated occupant.

3. In combination with a vehicle body including a seat, a door mounted for forwardly pivoting movement between open and closed positions with respect to a vehicle body opening adjacent the seat, and an occupant restraining belt arrangement with a restraining belt whose ends are secured adjacent generally vertically aligned inboard portions of the seat and whose intermediate portion slidably receives a first apertured member to define lap and shoulder belt portions, a control belt system comprising, a first control belt with one end secured to the first apertured member, a plurality of body and door mounted slide members generally adjacent an upper forward portion of the door, means securing the other end of the first control belt to one of the slide members with at least two intermediate belt portions extending between the body and the door and slidable over the slide members in a tackle arrangement to retract the one end of the first control belt during door opening movement and move the lap and shoulder belt portions forwardly to easy-enter positions, a second apertured member slidable along the first control belt between the first apertured member and the tackle arrangement, a second control belt with one end secured to the second apertured member, and a door mounted retractor including a rotatable reel selectively locked against belt extending movement, the reel receiving and normally retracting the other end of the second control belt to extend the one end of the first control belt from the tackle arrangement during door closing movement and move the lap and shoulder belt portions rearwardly to occupant restraining positions.

* * * * *